(12) United States Patent
Watanabe

(10) Patent No.: US 7,969,525 B2
(45) Date of Patent: Jun. 28, 2011

(54) LIQUID CRYSTAL DISPLAY DEVICE

(75) Inventor: Saburo Watanabe, Ichinomiya (JP)

(73) Assignee: Hitachi Displays, Ltd., Chiba-ken (JP)

( * ) Notice: Subject to any disclaimer, the term of this patent is extended or adjusted under 35 U.S.C. 154(b) by 255 days.

(21) Appl. No.: 12/155,190

(22) Filed: May 30, 2008

(65) Prior Publication Data

US 2008/0297687 A1 Dec. 4, 2008

(30) Foreign Application Priority Data

May 30, 2007 (JP) .................................. 2007-142777

(51) Int. Cl.
*G02F 1/13357* (2006.01)
(52) U.S. Cl. ................. 349/58; 349/60; 349/65
(58) Field of Classification Search .................. None
See application file for complete search history.

(56) References Cited

U.S. PATENT DOCUMENTS

| 2003/0223218 | A1* | 12/2003 | Kawakami | 362/31 |
|---|---|---|---|---|
| 2006/0268194 | A1* | 11/2006 | Morimoto et al. | 349/65 |
| 2007/0133222 | A1* | 6/2007 | Watanabe et al. | 362/561 |
| 2007/0147074 | A1* | 6/2007 | Sakai et al. | 362/608 |
| 2007/0211191 | A1* | 9/2007 | Cho et al. | 349/58 |
| 2008/0024694 | A1* | 1/2008 | Kondo et al. | 349/58 |
| 2008/0049444 | A1* | 2/2008 | Hsiao et al. | 362/611 |
| 2009/0116222 | A1* | 5/2009 | Hamada | 362/97.2 |

FOREIGN PATENT DOCUMENTS

| JP | 64-088426 | 4/1989 |
|---|---|---|
| JP | 2005-077753 | 3/2005 |

OTHER PUBLICATIONS

"3M Thermally Conductive Interface Pads—5506, 5506S, 5509, 5509S". Data sheet retrieved from http://www.saunderscorp.com/files/materials/3M-5506.pdf, dated Dec. 2005.*

* cited by examiner

*Primary Examiner* — Mike Stahl
(74) *Attorney, Agent, or Firm* — Stites & Harbison PLLC; Juan Carlos A. Marquez, Esq.

(57) ABSTRACT

There is provided a light source, which can efficiently be housed even if the area of the substrate increases while giving extra consideration to the heat radiation of the light emitting diodes in a liquid crystal display device using the light emitting diodes as a light source. A plate-like light source section is formed by arranging the light emitting diodes on a metal substrate. The plate-like light source section is formed to have a larger area than an entrance surface of a light guide plate, and is disposed so as to face the entrance surface of the light guide plate. The light guide plate and the plate-like light source section are housed in a housing case, and the housing case is formed to have a larger depth in a part for housing the plate-like light source section than in a part for housing the light guide plate. A cushion member is provided between the light guide plate and the housing case to prevent the light guide plate from being moved by vibrations.

12 Claims, 10 Drawing Sheets

LIQUID CRYSTAL DISPLAY DEVICE

BACKGROUND OF THE INVENTION

1. Field of the Invention

The present invention relates to a light source of a non-emissive display device, and in particular to a liquid crystal display device having a backlight using a light emitting diode (LED) as a light source.

2. Background Art

In recent years, liquid crystal display devices are often used as display devices. In particular, since liquid crystal display devices are low-profile, light-weight, and low-power consumption, and consequently, used as display section of portable equipment.

However, liquid crystal display devices are not light-emitting devices, and therefore, require lighting means. In general, as the lighting devices for liquid crystal display devices, planar lighting devices called a backlight are in widespread use. As the light emitting elements (also referred to as light sources) of the backlights, there have been used cold cathode fluorescent tubes in the past, and in recent years, there have also been used those using LEDs in portable equipment.

The liquid crystal display device using the LED as the light source is proposed in, for example, JP-A-64-88426. Further, there is also a description regarding the configuration of the backlight having a light guide plate using the LED in JP-A-2005-077753.

SUMMARY OF THE INVENTION

If a number of LEDs are used with the intention to increase intensity, the operation temperature rises to cause a problem of lowering the luminous efficiency. Therefore, it is consequently attempted to adopt a configuration of using a metal plate or the like as a circuit board to give extra consideration to heat radiation. It should be noted that since the metal plate is not flexibly deformed, the form of mounting is limited.

Further, if it is attempted to realize a liquid crystal display device with higher intensity, the number of light emitting elements increases, and in conjunction therewith, the number of wires for supplying the light emitting elements with voltage also increases, which should cause increase in the area of the circuit board on which the wires are formed.

The present invention is made in consideration of such circumstances, and an object thereof is for realizing a backlight with high reliability and capable of efficiently housing the circuit board even when the area of the circuit board increases in a liquid crystal display device having a backlight provided with a number of light emitting elements.

The liquid crystal display device according to the present invention includes a liquid crystal panel, a backlight for irradiating the liquid crystal panel with light, a plurality of light emitting elements provided to the backlight, a circuit board on which the light emitting elements are disposed, a light guide plate which the light from the light emitting elements enters, and a housing case for housing the circuit board and the light guide plate, and the housing case is formed to have a larger distance between the upper surface and the lower surface in the housing case in the vicinity of the circuit board than in the other part thereof. The liquid crystal display device further includes a cushion member disposed between the housing case and the light guide plate.

The present invention has a feature of efficiently housing the circuit board with the increased area in the backlight using the LEDs as the light emitting elements giving extra consideration to the heat radiation of the backlight of the liquid crystal display device.

According to the present invention, an LED light source with high reliability can be obtained in a liquid crystal display device using the LEDs as the light emitting elements. Further, it becomes possible to efficiently house the LED light source.

DESCRIPTION OF THE PREFERRED EMBODIMENTS

A liquid crystal display device has a liquid crystal panel and a backlight for irradiating the liquid crystal panel with light, the backlight having a light guide plate, a plate-like light source section formed along a side of the light guide plate, and a housing case for housing the light guide plate and the plate-like light source section, the light guide plate having an entrance surface the light from the plate-like light source section enters, an exit surface the light is emitted from, and a bottom surface facing the exit surface, the exit surface and the bottom surface having a predetermined distance from each other, the plate-like light source section having a light emitting surface on which light emitting elements are mounted, and the light emitting surface being disposed so as to face the entrance surface of the light guide plate.

The width of the plate-like light source section in the thickness direction of the light guide plate is formed to be greater than the thickness of the light guide plate, and the distance between the upper surface and the lower surface of the housing case is formed to be greater in an area adjacent to the entrance surface of the light guide plate than in the other area so as to house the plate-like light source section having a greater width than the thickness of the light guide plate. A part of the entrance surface of the light guide plate protrudes towards the plate-like light source section side, and a cushion member is provided between the protruding section of the light guide plate and the plate-like light source section.

A reflecting sheet is provided between the bottom surface of the light guide plate and the lower surface of the housing case. Since the width of the plate-like light source section is greater than the thickness of the entrance surface of the light guide plate, the plate-like light source section is divided into the upper side and the lower side of the surface on which the reflecting sheet is disposed, the light emitting element is disposed above the reflection sheet surface, and wires and electrical components used for a circuit are provided to the lower side thereof.

Figure 1:
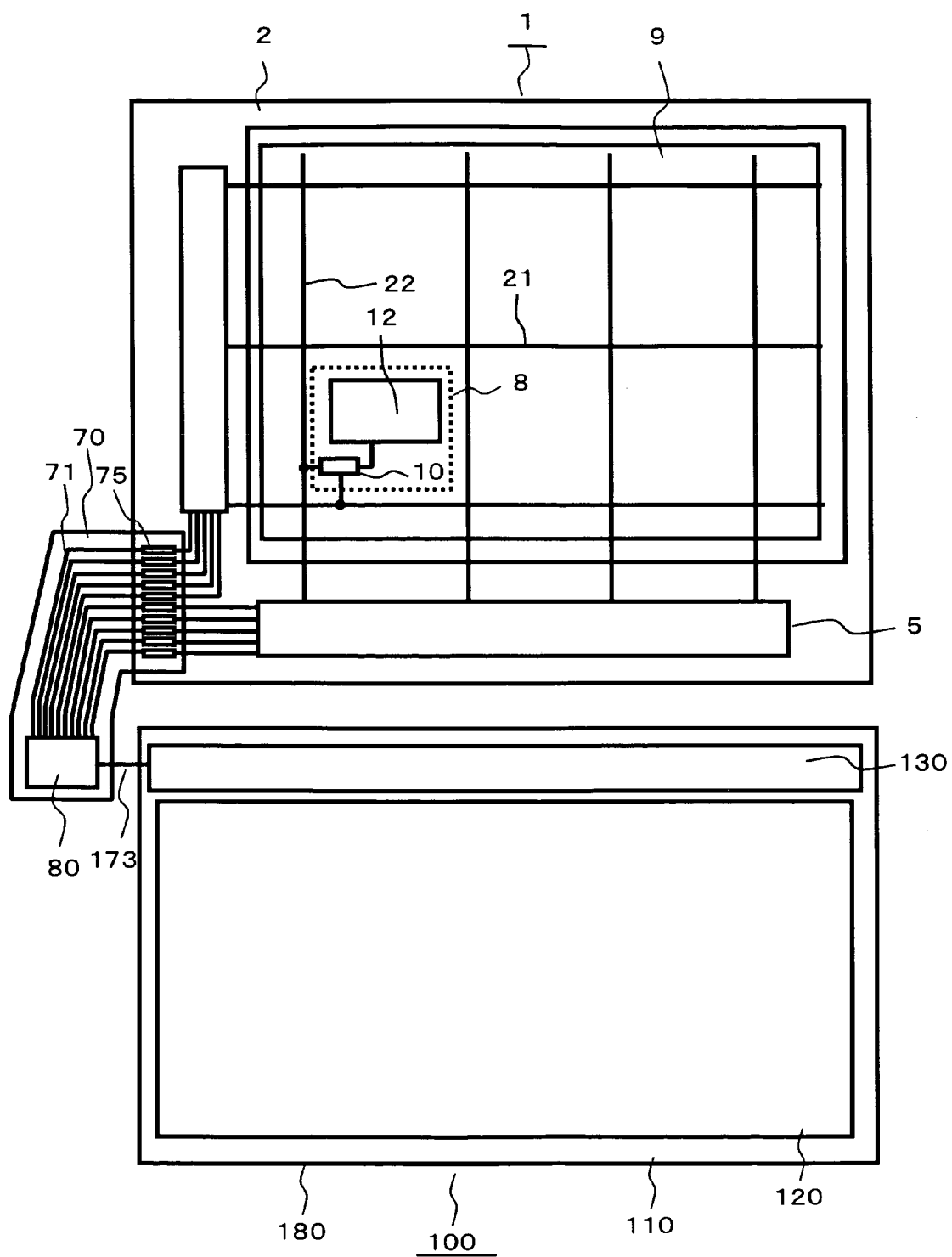
FIG. 1 is a block diagram showing a schematic configuration of a liquid crystal display device as an embodiment of the present invention.

FIG. 1 is a plan view showing a liquid crystal display device 100 according to the present invention. The liquid crystal display device 100 is mainly composed of a liquid crystal panel 1, a backlight 110, and a control circuit 80. Signals necessary for display of the liquid crystal panel 1 and a power supply voltage are supplied from the control circuit 80. The control circuit 80 is mounted on a flexible substrate 70, and the signals thereof are transmitted to the liquid crystal panel 1 through wires 71 and terminals 75. Further, the backlight 110 is also supplied with a necessary voltage via a wire 173.

The backlight 110 is mainly composed of a light guide plate 120, a light source section 130, and a housing case 180. The backlight 110 is provided for the purpose of irradiating the liquid crystal panel 1 with light. The liquid crystal panel 1 performs display by controlling an amount of transmission or an amount of reflection of the light irradiated from the backlight 110. It should be noted that although the backlight 110 is disposed so as to overlap the rear side or the front side of the liquid crystal panel 1 with respect to the observer, the backlight 110 and the liquid crystal panel 1 are shown side-by-side in FIG. 1 for the sake of easy understanding. Details of the backlight 110 will be described later.

Pixel sections 8 of the liquid crystal panel 1 are each provided with a pixel electrode 12. It should be noted that although the liquid crystal panel 1 is provided with a number of pixels 8 in a matrix, only one pixel section 8 is shown in FIG. 1 for preventing the drawing from becoming complicated. The pixel sections 8 disposed in a matrix form a display area 9, and each of the pixel sections 8 plays a role of a pixel of the display image to display the image on the display area 9.

The liquid crystal panel 1 is provided with gate signal lines (also referred to as a scan line) 21 extending in an x direction and disposed in parallel to each other in a y direction in the drawing, and drain signal lines (also referred to as an image signal line) 22 extending in the y direction and disposed in parallel to each other in the x direction, and the pixel sections 8 are formed in respective areas surrounded by the gate signal lines 21 and the drain signal lines 22.

The pixel section 8 is provided with a switching element 10. A control signal is supplied from the gate signal line 21 to control turning on/off of the switching element 10. When the switching element 10 becomes in an on state, the image signal transmitted through the drain signal line 22 is supplied to the pixel electrode 12.

The drain signal line 22 is connected to a drive circuit 5, and the drive circuit 5 outputs the image signal. The gate signal line 21 is connected to a drive circuit 6, and the drive circuit 6 outputs the control signal. It should be noted that the gate signal lines 21, the drain signal lines 22, the drive circuit 5, and the drive circuit 6 are formed on the same TFT substrate 2.

Figure 2A:
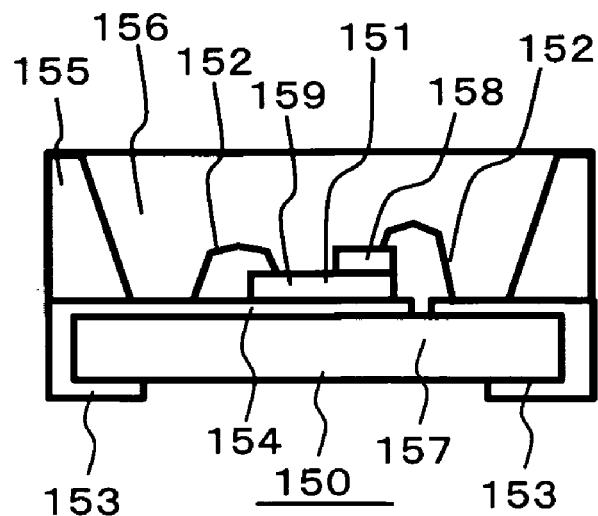
FIGS. 2A and 2B are schematic diagrams showing a light emitting diode of a liquid crystal display device as an embodiment of the present invention.
Figure 2B:
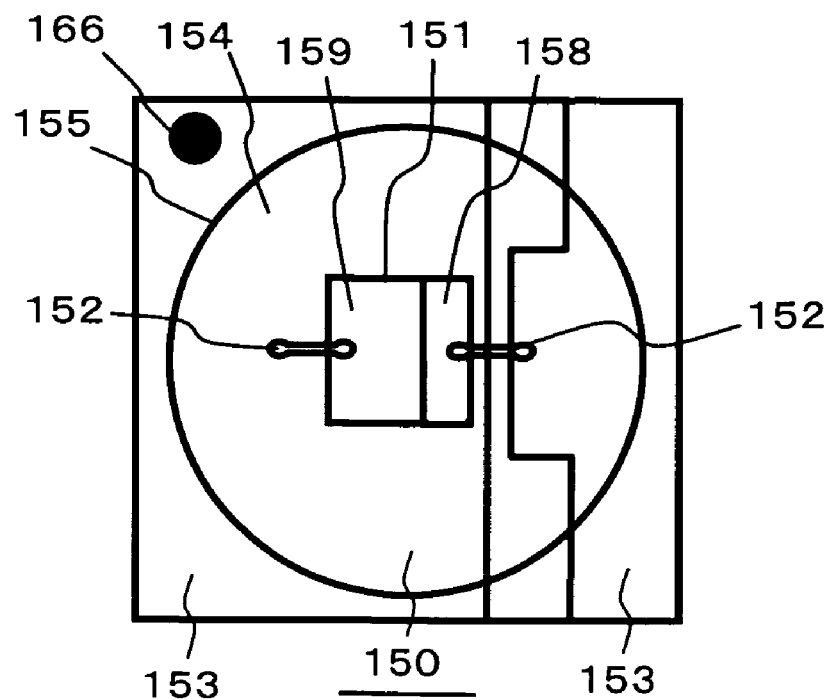

Then, FIGS. 2A and 2B show schematic diagrams of an LED 150 as the light emitting element. FIG. 2A shows a schematic cross-sectional view, and FIG. 2B shows an elevation view of the light emitting side thereof.

The LED 150 has a structure having an LED chip 151 as a light emitting section mounted on a chip substrate 157. The LED chip 151 has a p-n junction, and when applying a voltage to the p-n junction, light with a specific wavelength is emitted therefrom. The p-type semiconductor layer and the n-type semiconductor layer forming the p-n junction are respectively provided with a p-electrode (anode) 158 and an n-electrode (cathode) 159.

Each of the p-electrode 158 and the n-electrode 159 is provided with a wire 152 connected thereto. The wires 152 electrically connect the p-electrode 158 and the n-electrode 159 to chip terminals 153 provided for connecting the LED 150 to the outside.

In some cases, there is provided a fluorescence emission section 156 on the exit surface side of the LED chip 151. The fluorescence emission section 156 has a function of converting the wavelength of the light emitted from the LED chip 151. The reference numeral 155 denotes a conical reflecting surface for reflecting the light proceeding in the lateral direction towards the exit surface side. The reference numeral 166 denotes a mark indicating the position of the cathode (or the anode).

The chip terminal 153, which is connected to an external wire or the like on the rear surface of the chip substrate 157, extends from the rear surface of the chip substrate 157 up to the exit surface side thereof via the side surface thereof to form a chip mounting section 154. In the case in which the chip terminal 153 and the chip mounting section 154 are formed of metal with high optical reflectance, the chip mounting section 154 can be used as an optical reflecting surface. Further, when the chip terminal 153 and the chip mounting section 154 are formed of metal (an electrically conductive material can be used as well) with high thermal conductivity, it is possible to radiate the heat generated in the LED chip 151 to the rear side of the chip substrate 157.

Figure 3A:
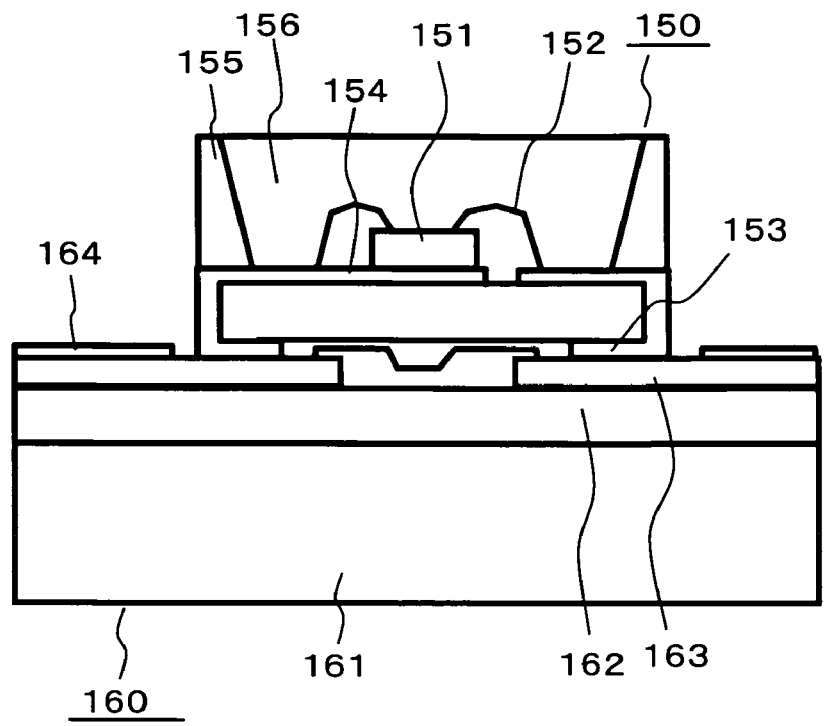
FIGS. 3A and 3B are schematic diagrams showing a condition of mounting the light emitting diode of a liquid crystal display device as an embodiment of the present invention on a metal substrate.
Figure 3B:
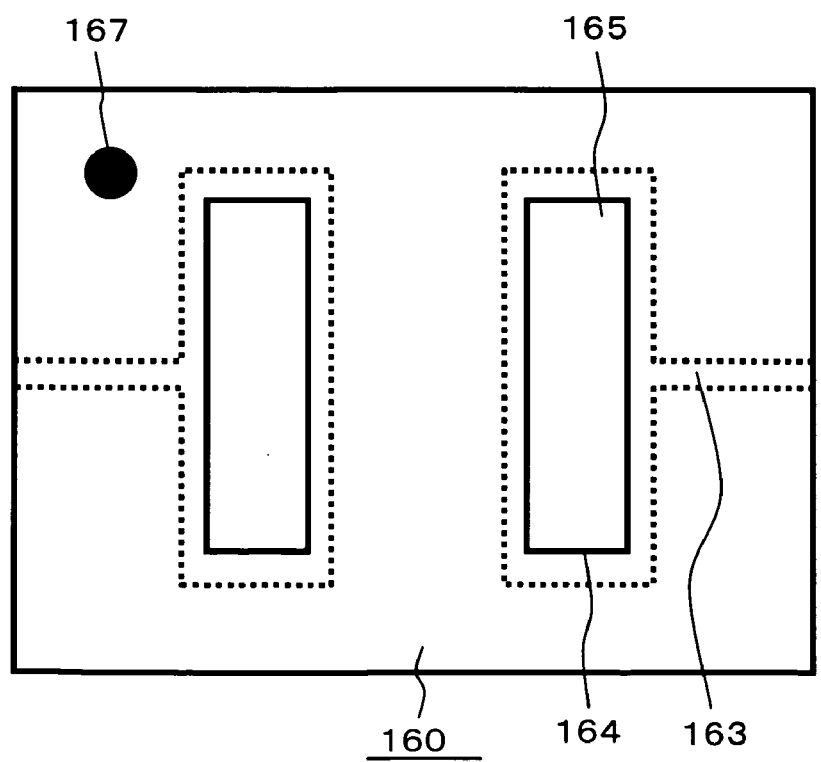

Then, a substrate on which the LEDs 150 are mounted will be explained with reference to FIGS. 3A and 3B. FIG. 3A is a schematic cross-sectional view showing the condition in which the LED 150 is mounted on a metal substrate 161. FIG. 3B is a schematic elevation view of a part thereof on which the LED 150 is mounted.

The mounting substrate 160 has the metal substrate 161 provided with an FPC 162 disposed thereon, and forms wires 163 with an electrically conductive layer such as a copper foil disposed on the FPC 162. On the wires 163, there is provided an insulating layer 164, and a pad 165 for connection is formed by an opening section of the insulating layer 164 formed on the electrically conductive layer.

By using metal as the base material of the mounting substrate 160, the heat conducted to the rear side of the chip substrate 157 can efficiently be radiated. In order for enhancing the efficiency of heat radiation, it is desirable that the insulating layer 164 is thin to the extent of not causing the problem of short circuit or leakage. In the present embodiment, the insulating layer with the thickness of 0.12 mm and the thermal conductivity of 6.5 W/m·K is used.

To the pad 165 for connection formed at the end of the wire, there is electrically connected the chip terminal 153 of the LED 150. As described above, the surface of the mounting substrate 160 is coated with the insulating layer 164 to prevent the short circuit of the wires on the front surface of the mounting substrate 160 with the other constituting matters, thus maintaining the isolation between the pads 165. The pads 165 are coated with solder paste or the like by printing, and the LED 150 is mounted on the mounting substrate 160 by a reflow process or the like.

A material with low affinity with solder is selected as the material for the insulating layer 164 for the reason of using the solder reflow process, and further the material with an achromatic color is preferable because the insulating layer is formed on the front surface of the mounting substrate 160. In particular consideration of the use efficiency of the light, what is white or nearly white capable of providing a large amount of reflected light is preferable. As a material with high reflectivity, titanium oxide or the like is suitable. It should be noted that the reference numeral 167 denotes a mark indicating the position of the cathode (or the anode). In order for enhancing the visibility, a different color from the color used for the insulating layer 164 is used.

Figure 4A:
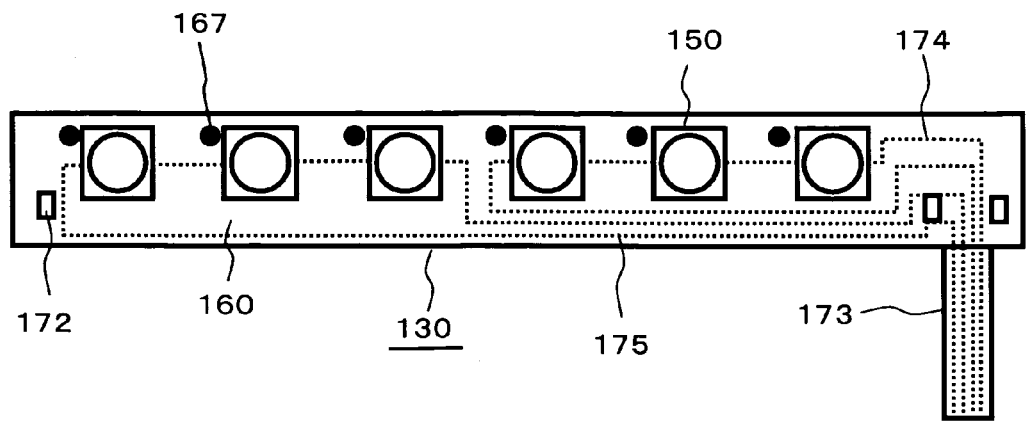
FIGS. 4A through 4C are schematic diagrams showing a plate-like light source section of a liquid crystal display device as an embodiment of the present invention.
Figure 4B:
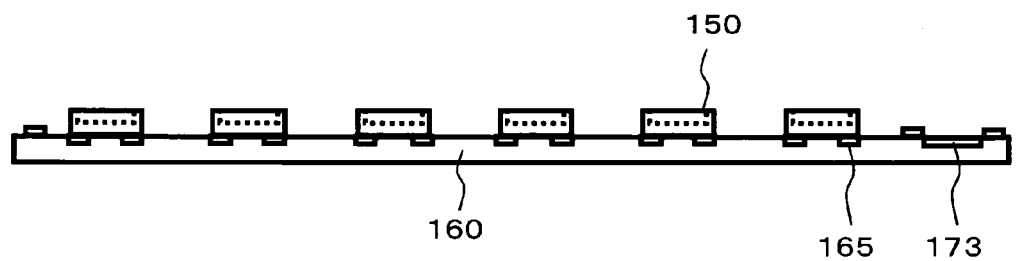
Figure 4C:
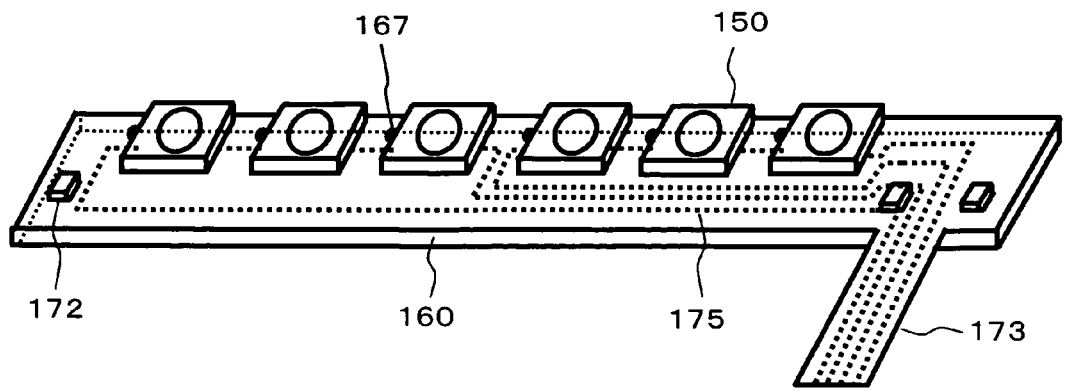

Then, with reference to FIGS. 4A through 4C, there is shown the condition in which the LEDs 150 are mounted on the mounting substrate 160 in a line to form a plate-like light source section 130. FIG. 4A is a schematic elevation view, FIG. 4B is a schematic cross-sectional view, and FIG. 4C is a schematic perspective view.

In FIGS. 4A through 4C, the six LEDs 150 are arranged on the mounting substrate 160 so as to form the linear light source. In the LED 150, there is caused a predetermined voltage difference in the p-n junction from the characteristic as a diode. Since the voltage difference in the p-n junction varies by the manufacturing process, adjustment is performed so that the optimum voltage is applied to the p-n junction. However, in the case in which n LEDs 150 are connected in parallel, n adjustment circuits are required, which causes a problem of increasing the manufacturing cost for the adjustment.

In FIGS. 4A through 4C, the LEDs 150 are connected in series every three units, and the voltage is adjusted for every three units. In the case in which the voltage of 12V for in-car products is used as the power supply voltage, and potential difference caused in each LED 150 is roughly 4V, it is efficient to connect three units in series. In other words, good efficiency can be obtained by the relationship among the power supply voltage V, the potential difference Vd caused in an average LED 150, and the number (n) of the LEDs satisfying $V \geq n \times Vd$. It should be noted that in the case in which the potential difference caused in each of the LEDs 150 is roughly 3V, and the power supply voltage is 12V, connecting four units in series is efficient. Further, in the case in which the adjustment is performed by inserting a resistance 172 between the last LED 150 of the n LEDs 150 connected in series and the ground potential, two wires, namely the wire 174 for supplying the voltage and the wire 175 for the return of the voltage, are required for every serial connection. According to the present embodiment, the four wires are used, and are respectively connected to the external connection wires 173.

As shown in FIG. 4C, the wires 174, 175 are disposed on the mounting substrate 160, and as the number of the LEDs 150 increases, the area for disposing the wires 174, 175 also increases. On the lower side of the LEDs 150 in the drawing, there are disposed the wires 174, 175 corresponding to the number of the LEDs 150. Further, the electrical components necessary for the circuit such as resistances or capacities are also disposed on the mounting substrate 160.

Figure 5:
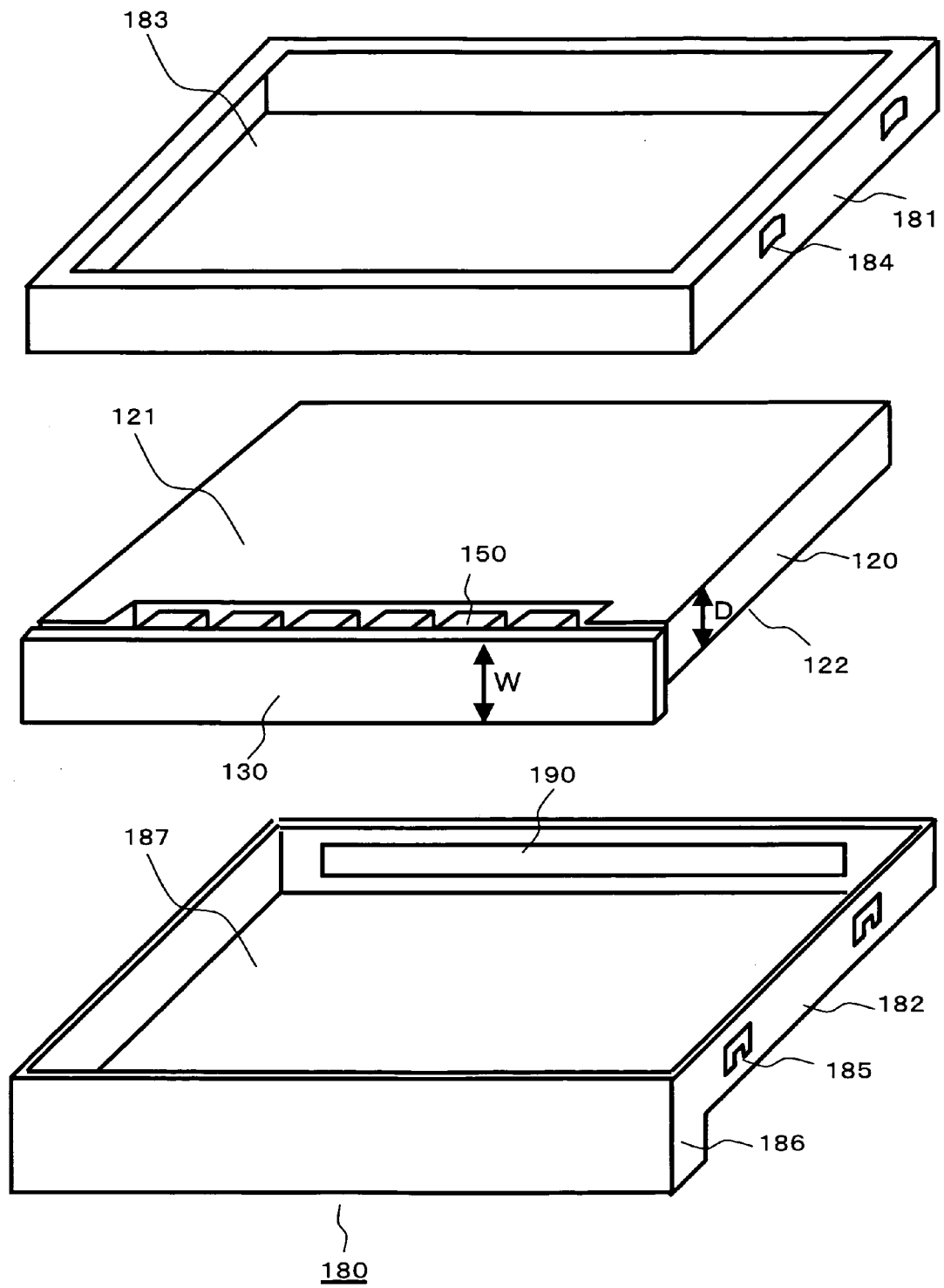
FIG. 5 is a schematic diagram showing a structure of a backlight of a liquid crystal display device as an embodiment of the present invention.

Then, with reference to FIG. 5, a housing case 180 for housing the light guide plate 120 and the plate-like light source section 130 will be explained. The housing case 180 has a shape of forming metal or the like to have a box-like shape to hold and house the light guide plate 120 from above and below.

The light guide plate 120 has an exit surface 121 and a bottom surface 122, and the light entering from the plate-like light source section 130 is emitted from the exit surface 121. The exit surface 121 and the bottom surface 122 have a predetermined distance D. In comparison between the thickness D of the light guide plate 120 and the width W of the plate-like light source section 130, the width W of the plate-like light source section 130 becomes greater than the thickness D of the light guide plate 120 as the number of the wires increases.

The reference numeral 181 denotes an upper case provided with an opening 183 for outputting the light. The light emitted from the opening 183 illuminates the liquid crystal panel. The upper case 181 is provided with engaging sections 184 with a lower case 182.

The reference numeral 182 denotes the lower case provided with a housing section 186 for the plate-like light source section 130 and a housing section 187 for the light guide plate 120. Since the width W of the plate-like light source section 130 is greater than the thickness D of the light guide plate 120, the housing section 186 of the plate-like light source section 130 has a concave shape downward from the housing section 187 of the light guide plate 120. Further, the lower case 182 is provided with engaging sections 185 with the upper case 181, and the engaging sections 185 are fit the engaging sections 184 of the upper case 181.

Cushion members 190 are provided between the lower case 182 and the light guide plate 120 to prevent the light guide plate 120 from being moved or broken by vibrations or the like.

Figure 6:
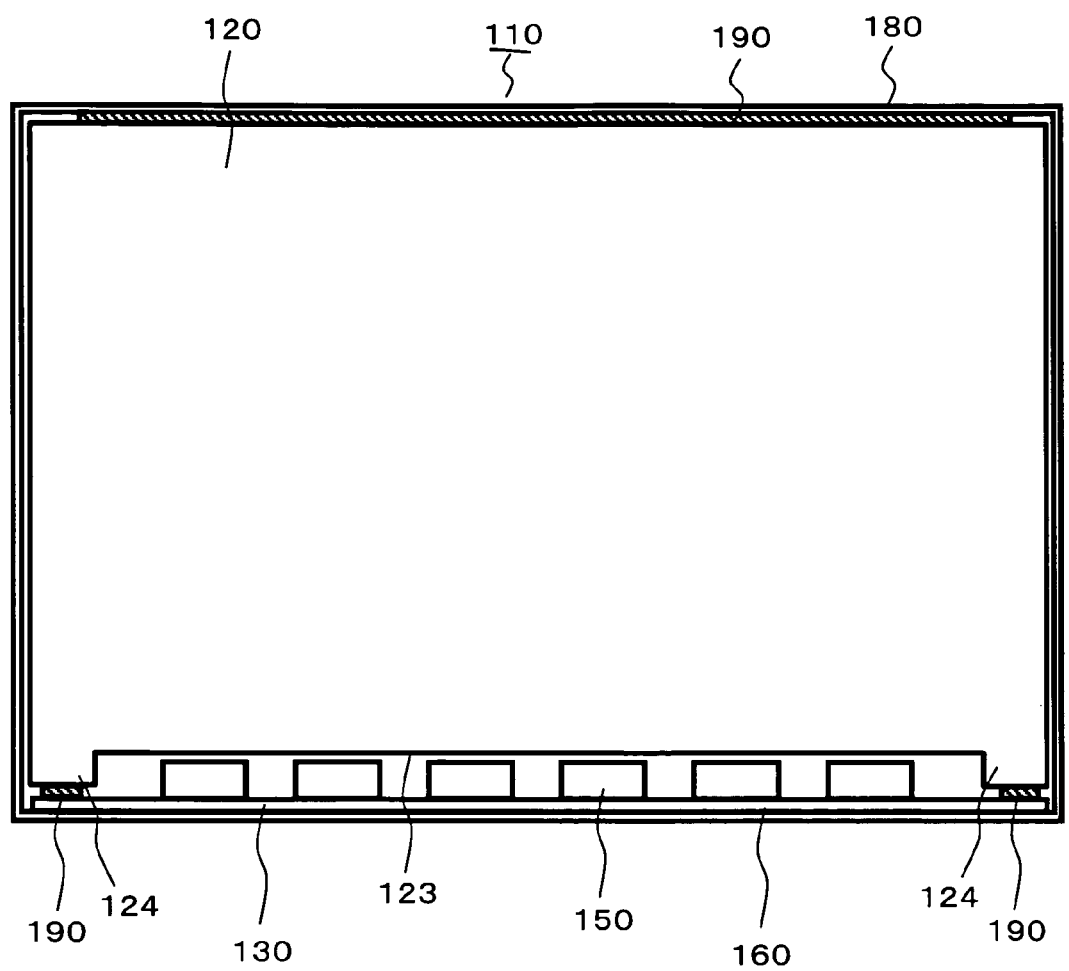
FIG. 6 is a schematic plan view showing a structure of a backlight of a liquid crystal display device as an embodiment of the present invention.

The layout of the cushion members 190 will be explained showing a plan view of the backlight 110 on the exit surface side thereof in FIG. 6.

If the distance between the entrance surface 123 of the light guide plate 120 and the LEDs 150 varies, a problem of variation of the light intensity (light entrance ratio) of the incident light arises. Therefore, it is required to arrange that the distance between the entrance surface 123 and the LEDs 150 is not easily varied by vibrations and so on.

Therefore, the LEDs 150 and the entrance surface 123 should be disposed with a distance so narrow as to almost have contact with each other. However, although there has been no problem in the past even if the entrance surface 123 and the LEDs 150 have contact with each other, it has been found out that in the case in which the light guide plate 120 with a large area is used there arises a problem that the LEDs 150 are damaged or the light guide plate 120 is deformed by shrinkage caused by thermal expansion or their own weight.

It should be noted that in the case in which a long distance is provided between the entrance surface 123 and the LEDs 150 in order for improving the reliability, the problem of lower light entrance ratio arises.

To cope with the above, there is adopted a configuration of providing protruding sections 124 on both ends of the entrance surface 123 and holding the cushion members 190 between the protruding sections 124 and the mounting substrate 160 of the plate-like light source section 130. Further, the cushion member 190 is also provided between the surface opposed to the entrance surface 123 and the housing case 180.

Figure 7:
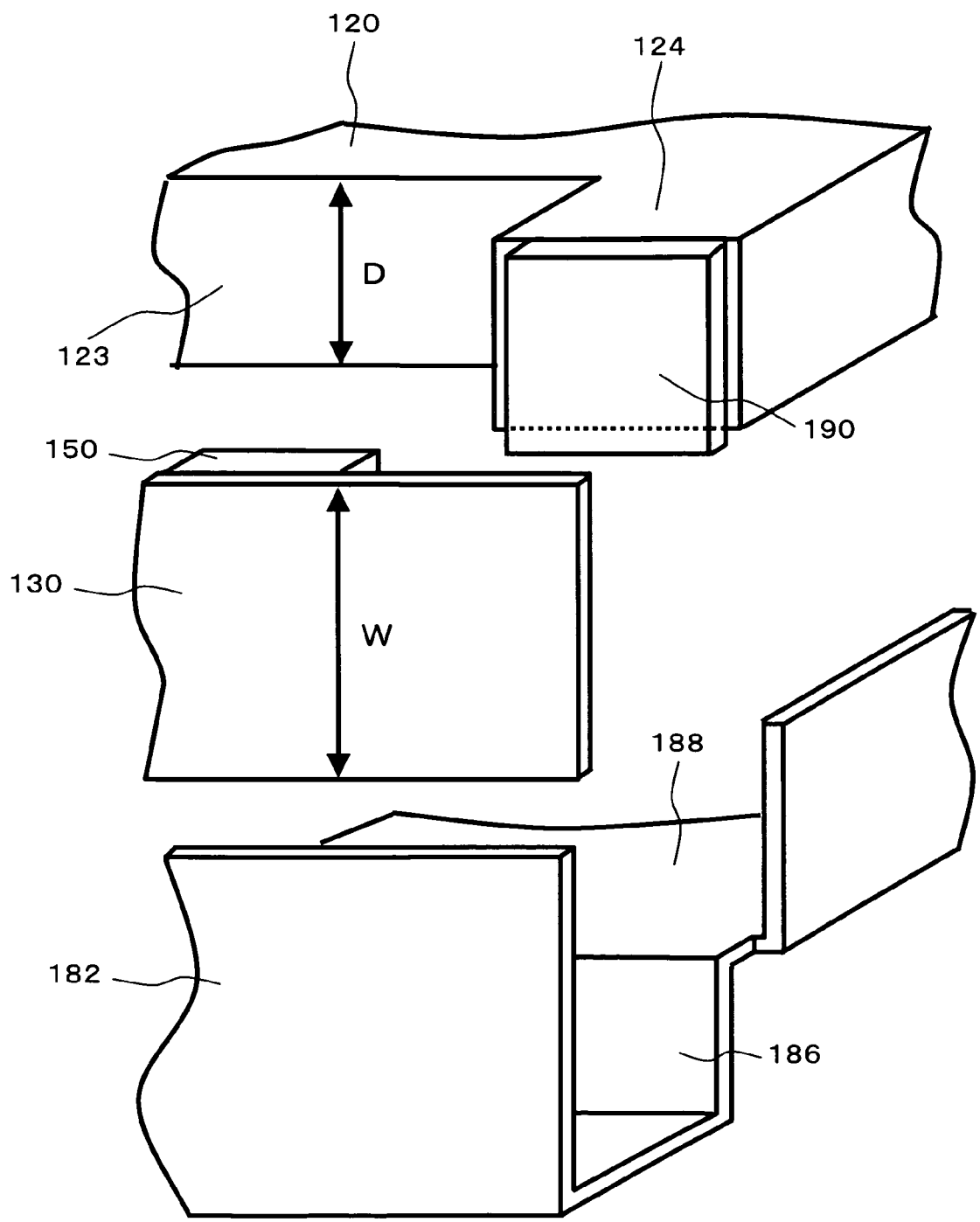
FIG. 7 is a schematic diagram showing a structure of a backlight of a liquid crystal display device as an embodiment of the present invention.

FIG. 7 shows an enlarged view of the vicinity of the protruding sections 124 of the light guide plate 120. The cushion member 190 is provided on the side of the plate-like light source section 130 of the protruding section 124. The distance between the entrance surface 123 and the LEDs 150 is kept constant by the protruding section 124. Further, the cushion member 190 can prevent the plate-like light source section 130 from being damaged by the protruding section 124. It should be noted that by selecting the white or nearly white material having high reflectivity as the cushion member 190, the light from the LEDs 150 can be prevented from leaking through the concave housing section 186.

The width W of the plate-like light source section 130 is arranged to be greater than the height D of the entrance surface 123, and consequently, the housing section 186 is provided to the lower case 182. The lower surface 188 of the lower case 182 is formed of a metal plate, and the lower surface 188 is bent downward in the vicinity of the plate-like light source section 130 so as to be concaved to form the housing section 186.

Figure 8:
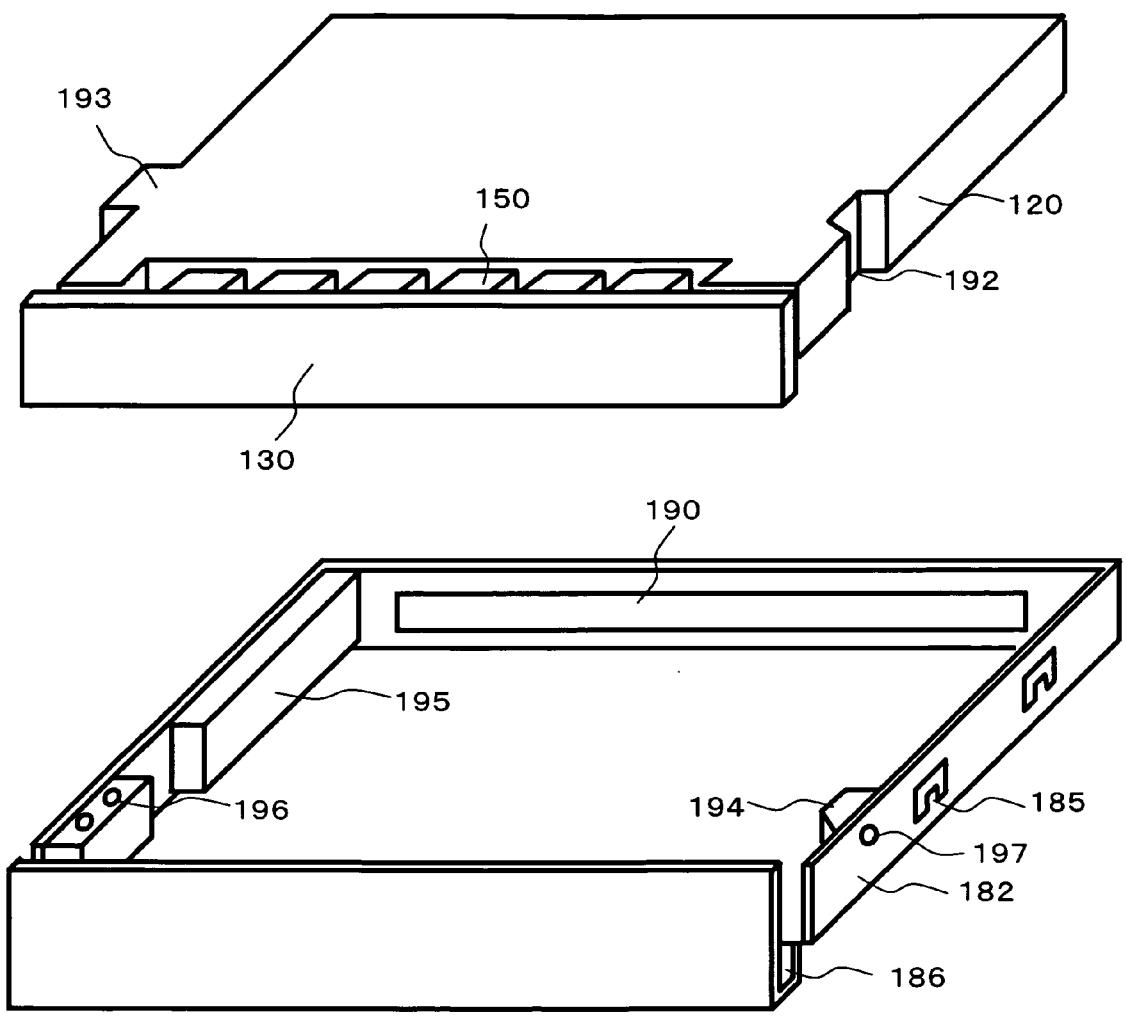
FIG. 8 is a schematic diagram showing a structure of a backlight of a liquid crystal display device as an embodiment of the present invention.

Then, with reference to FIG. 8, a configuration of fixing the light guide plate 120 will be explained. The lower case 182 is provided with the cushion member 190, a fixing protrusion 194, and a support member 195. The fixing protrusion 194 is fit a groove section 194 provided to fix the light guide plate 120. The fixing protrusion 192 is made of resin and is held by a hole 197 provided to the lower case 182.

Further, the lower case 182 is provided with the support member 195, which is fit a protruding section 193 of the light guide plate 120 to fix the light guide plate 120. The support member 195 is provided with protrusions 196 for positioning an optical sheet (not shown) and so on disposed on the light guide plate 120.

Figure 9A:
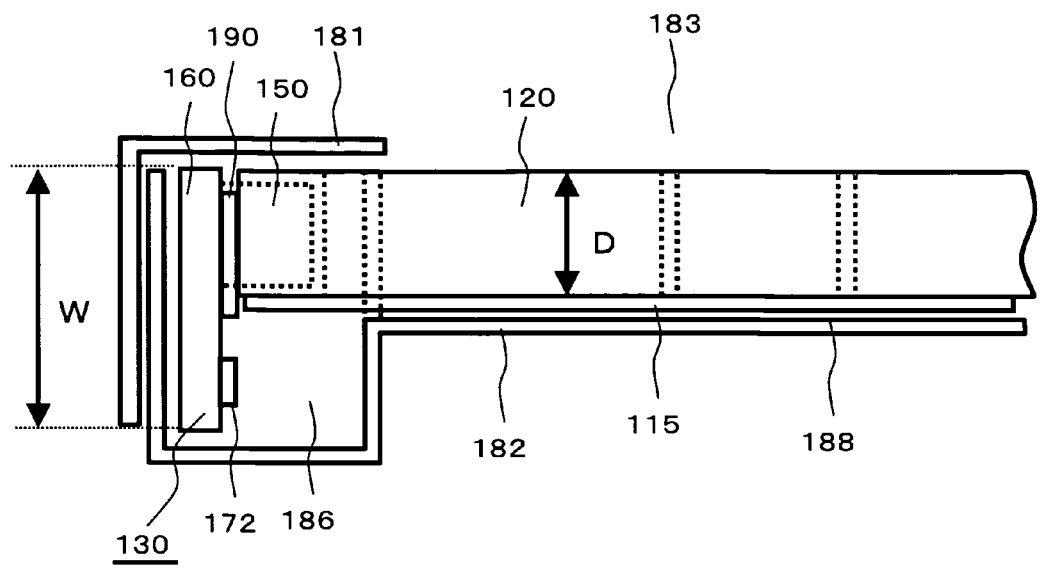
FIGS. 9A and 9B are schematic diagrams showing a structure of a backlight of a liquid crystal display device as an embodiment of the present invention.
Figure 9B:
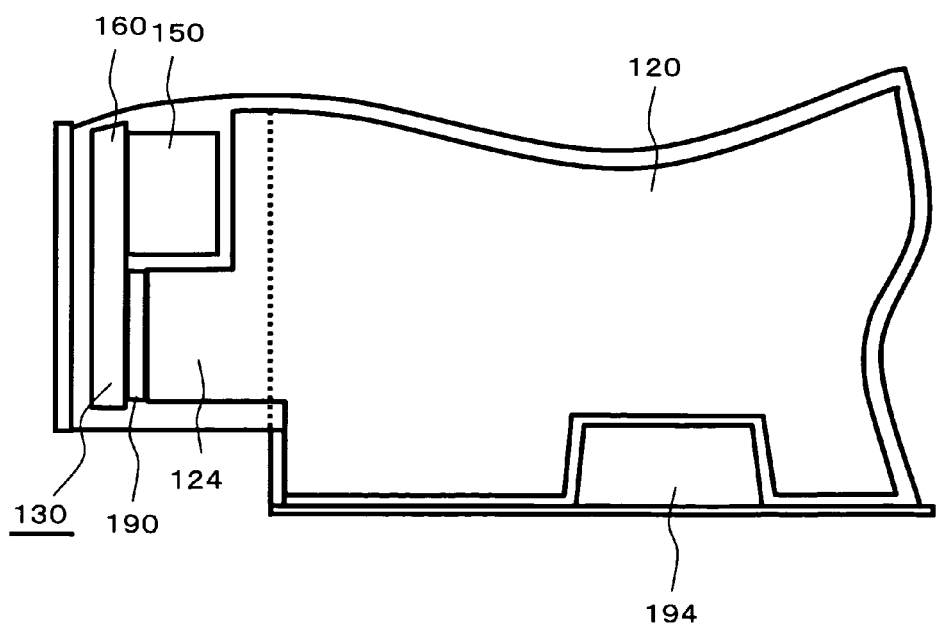

FIGS. 9A and 9B show a positional relationship between a reflecting sheet 115 and the cushion member 190. FIG. 9A is a schematic cross-sectional view and FIG. 9B is a partial plan view of the vicinity of the protruding section 124. The light guide plate 120 is disposed on the lower surface 188 of the lower case 182, and the reflecting sheet 115 is disposed between the light guide plate 120 and the lower surface 188. The surface of the reflecting sheet 115 on the side of the light guide plate 120 has high reflectivity, and reflects the light emitted from the light guide plate 120 towards the side of the opening 183 for outputting the light.

The width W of the plate-like light source section 130 is arranged to be greater than the thickness D of the light guide plate 120, and the plate-like light source section 130 extends downward from the bottom surface of the light guide plate 120 to be disposed in the housing section 186. It should be noted that the LEDs 150 is positioned in substantially the same level as the light guide plate 120 so that the light enters the light guide plate 120.

Although a part of the light emitted from the LEDs 150 also proceeds towards the housing section 186, the reflecting sheet 115 extends from the lower surface 188 towards the lower end of the LEDs 150, and the light proceeding towards the housing section 186 is reflected to the side of the light guide plate 120.

Further, although a part of the light proceeding towards the protruding section 124 also proceeds towards the cushion member 190, it is possible to reflect such light again to the side of the light guide plate 120 by providing a surface with high reflectivity to the cushion member 190. Further, a surface with high reflectivity can be provided to the mounting substrate 160.

Further, the lower end of the cushion member 190 is arranged to extend to the lower side from the surface formed by the reflecting sheet 115 to prevent the light leakage. Further, the upper side of the plate-like light source section 130 separated by the reflecting sheet 115 is provided with the LEDs 150, and the lower side thereof is provided with the electrical components 172 and wires (not shown). In other words, the housing section 186 is divided by the reflecting sheet 115 into an area provided with optical components such as the LEDs 150 and an area provided with the electrical components 172 and so on.

Figure 10:
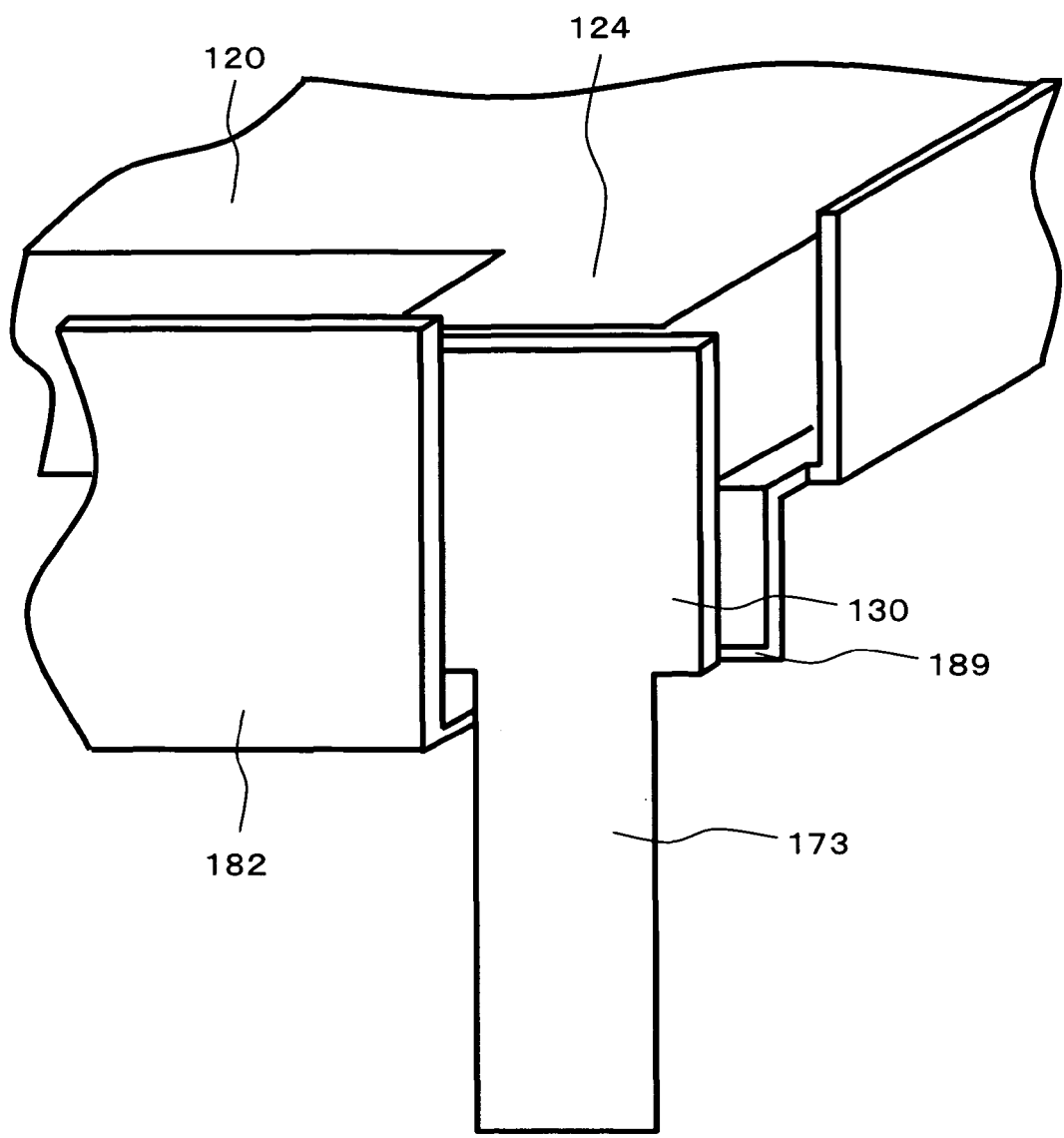
FIG. 10 is a schematic diagram showing a structure of a backlight of a liquid crystal display device as an embodiment of the present invention.

FIG. 10 shows how to get out the external connection wires 173 from the lower case 182. A notch 189 is provided to an end of the housing section 186, and the external connection wires 173 are gotten out from the notch 189 to the outside of the lower case 182. It should be noted that since the notch 189 is covered by the upper case (not shown), a problem of leakage of light or the like does not arise.

What is claimed is:

1. A liquid crystal display device comprising:
a display panel;
a backlight for irradiating the display panel with light;
a plurality of light emitting elements provided to the backlight;
a circuit board on which the light emitting elements are disposed;
a light guide plate which the light from the light emitting elements enters;
a reflecting sheet reflecting a light outputting from a bottom surface of the light guide plate and including a lower surface;
the edge of the reflecting sheet being disposed under the lower end of the light emitting element; and
a housing case for housing the light guide plate and holding the reflecting sheet and the light guide plate,
wherein a surface of the circuit board on which the light emitting elements are mounted is provided so as to face an entrance surface of the light guide plate,
a width of the circuit board is greater than a thickness of the entrance surface of the light guide plate,
the housing case has a deeper part in the vicinity of the entrance surface so as to cover the circuit board,
a lower edge and a wiring of the circuit board are provided under the lower surface of the reflecting sheet, and
a cushion member is provided between the light guide plate and the housing case.

2. A liquid crystal display device according to claim 1, wherein the light emitting elements are LEDs.

3. A liquid crystal display device according to claim 1, wherein the cushion member has a surface with high reflectivity.

4. A liquid crystal display device according to claim 1, wherein the circuit board includes a metal plate and a flexible substrate overlapping each other.

5. A liquid crystal display device comprising:
a liquid crystal panel;
a sheet light source device for irradiating the liquid crystal panel with light;
a plurality of light emitting diodes arranged in a line inside the sheet light source device;
a circuit board for electrically connecting the light emitting diodes;
a light guide plate having an entrance surface which light from the light emitting diodes enters;
a reflecting sheet reflecting a light outputting from a bottom surface of the light guide plate and including a lower surface;
the edge of the reflecting sheet being disposed under the lower end of the light emitting diode; and
a housing section for housing the light guide plate and holding the reflecting sheet and the light guide plate,
wherein the circuit board is disposed so as to face the entrance surface of the light guide plate, a lower end of the circuit board is positioned lower from a bottom surface of the light guide plate, a lower surface of the housing section is bent downward on the entrance surface side of the light guide plate so as to follow the circuit board, a protruding section is formed from the entrance surface of the light guide plate towards the circuit board, a lower edge and a wiring of the circuit board are provided under the lower surface of the reflecting sheet, and a cushion member is provided between the protruding section and the circuit board.

6. A liquid crystal display device according to claim 5, wherein a width of the circuit board is greater than a thickness of the entrance surface of the light guide plate.

7. A liquid crystal display device according to claim 5, wherein the cushion member has a surface with high reflectivity.

8. A liquid crystal display device according to claim 5, wherein the circuit board includes a metal plate and a flexible substrate overlapping each other.

9. A liquid crystal display device comprising:
a liquid crystal panel;
a backlight for irradiating the liquid crystal panel with light; and
a control section for controlling the liquid crystal panel, wherein the backlight includes
a light guide plate, and
a plate-like light source section formed along a side of the light guide plate, the plate-like light source section has a light emitting surface having a plurality of light emitting diodes mounted, a width of the light emitting surface is greater than a thickness of the light guide plate, a reflecting sheet is formed under the light guide plate and includes a lower surface, the edge of the reflecting sheet is disposed under the lower end of the light emitting diode, a lower edge of the plate-like light source section is provided under the lower surface of the reflecting sheet, the light emitting diodes are formed on an upper side of the light emitting surface from the reflecting sheet, and a wire is provided to a lower side of the light emitting surface from the reflecting sheet.

10. A liquid crystal display device according to claim 9, wherein the light emitting diodes are arranged in a line.

11. A liquid crystal display device according to claim 9, wherein the light guide plate is housed in a housing case, and a cushion member is provided between the housing case and the light guide plate.

12. A liquid crystal display device according to claim 9, wherein the plate-like light source section includes a metal plate and a flexible substrate overlapping each other.

* * * * *